Aug. 12, 1952   W. F. MITCHELTREE   2,606,475
ELECTRICALLY IGNITED MATCH HEAD AND THE
METHOD FOR MAKING THE SAME
Filed June 27, 1946   7 Sheets-Sheet 1

Inventor
Walter F. Mitcheltree
By L. Donald Myers
Attorney

Aug. 12, 1952         W. F. MITCHELTREE         2,606,475
           ELECTRICALLY IGNITED MATCH HEAD AND THE
                   METHOD FOR MAKING THE SAME
Filed June 27, 1946                          7 Sheets-Sheet 3

Inventor
Walter F. Mitcheltree
By R. Donald Mayes
Attorney

Patented Aug. 12, 1952

2,606,475

UNITED STATES PATENT OFFICE 2,606,475

ELECTRICALLY IGNITED MATCH HEAD AND
THE METHOD FOR MAKING THE SAME

Walter F. Mitcheltree, Lincolnshire, Ill., assignor to Cardox Corporation, Chicago, Ill., a corporation of Illinois Application June 27, 1946, Serial No. 679,852

10 Claims. (Cl. 86—1)

This invention relates to electrically ignited match heads and to the method for making the same.

Electrically ignited match heads are employed in firing detonators, powder blasting charges and the chemical heater units employed in reusable blasting cartridges containing liquid carbon dioxide.

The wires of these electrically ignited match heads in the past generally have been held together by a plug made of a sulfur composition. However, these sulfur plugs have not been entirely satisfactory for the reasons that they are fragile. As the match heads usually are installed in the field, they receive fairly rough treatment and it is therefore important that they be of a strong construction.

An object of the present invention is to provide electric match heads having sealing plugs made of a thermo plastic material which will serve to rigidly bind the wires of the matches together.

A further object of the invention is the provision of a novel method of manufacturing electrically ignited match heads as a result of which a plurality of match heads are produced simultaneously as a continuous strip which is so notched or weakened that it subsequently can be broken up into the individual match heads.

Electrically ignited match heads of the type with which this invention is concerned and a method for manufacturing such match heads are disclosed and claimed in Patent 2,260,558, issued to Clarence H. Caughey et al., on October 28, 1941.

The present invention presents refinements over the disclosure of the aforesaid patent which not only adapt it to the use of thermoplastic material to form the sealing plug of the match, but which also make it possible to carry on the manufacture in a more expeditious manner.

Figure 1:
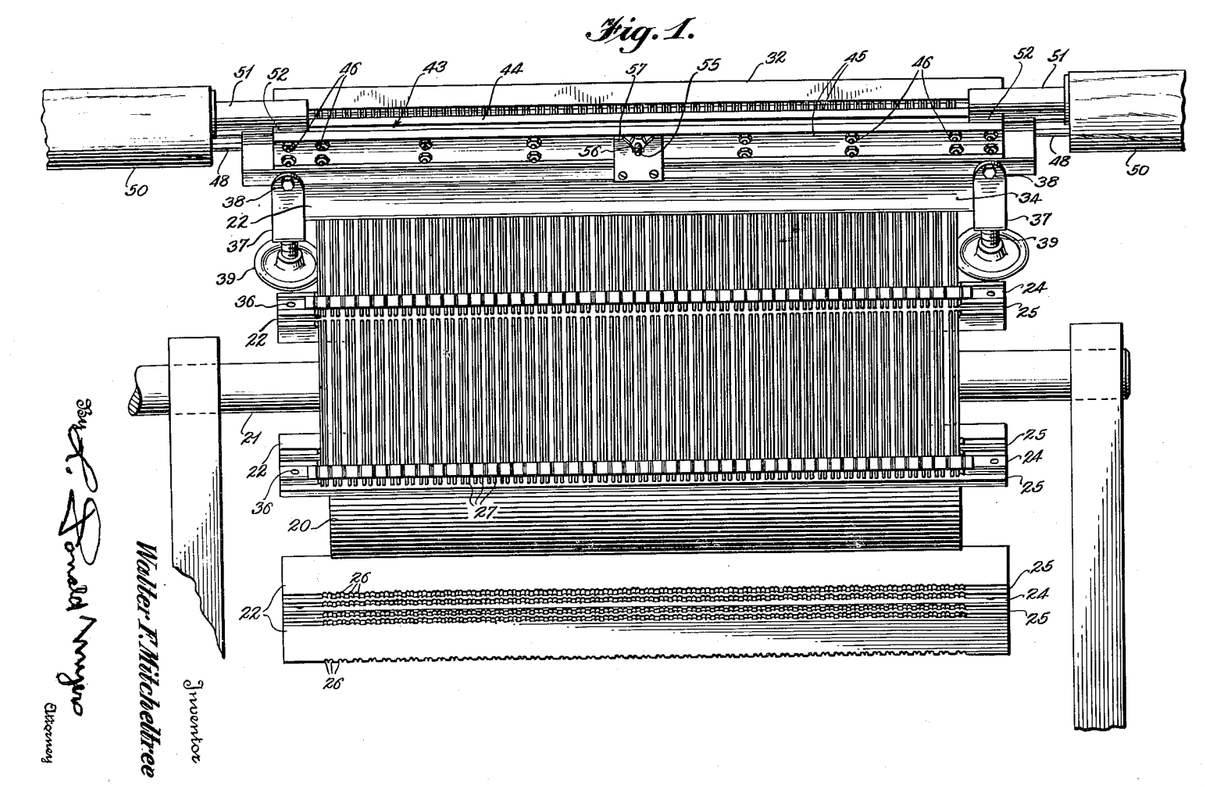
Figure 1 is a front elevational view of a wheel or drum upon which the thermoplastic material is applied to the wires, and to which a molding device has been affixed.
Figure 2:
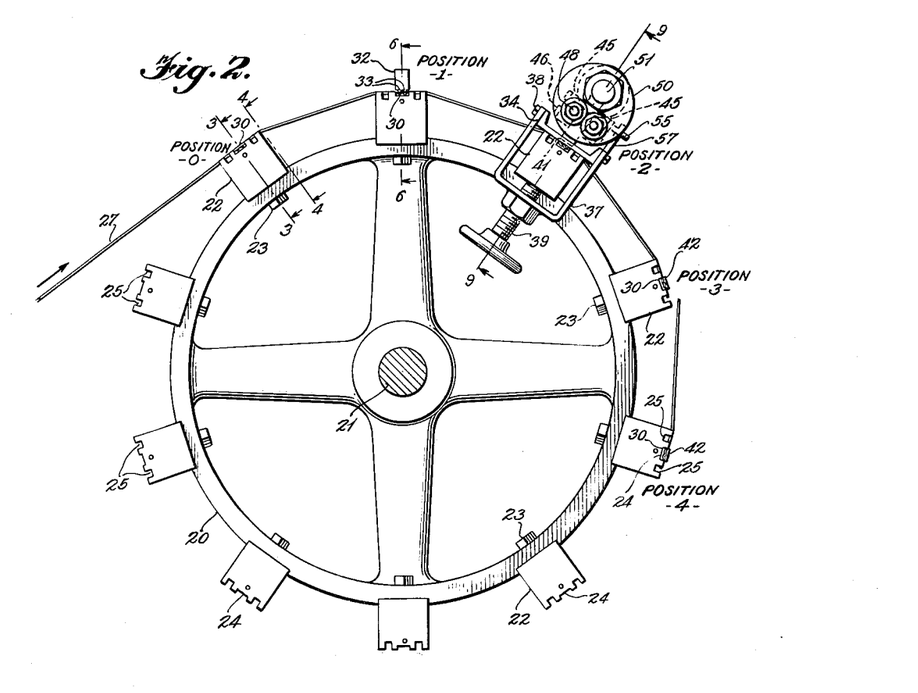
Figure 2 is an end elevational view of the apparatus of Figure 1.
Figure 3:
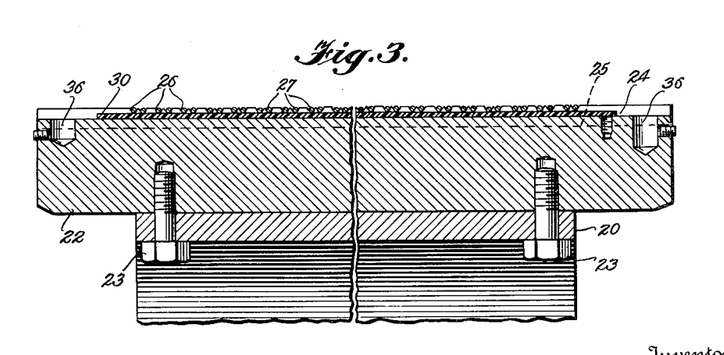
Figure 3 is a sectional view on line 3—3 of Figure 2 on an enlarged scale.
Figure 4:
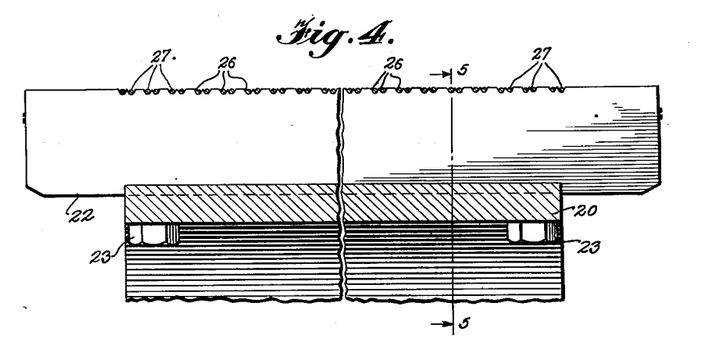
Figure 4 is a sectional view on line 4—4 of Figure 2 on an enlarged scale.
Figure 5:
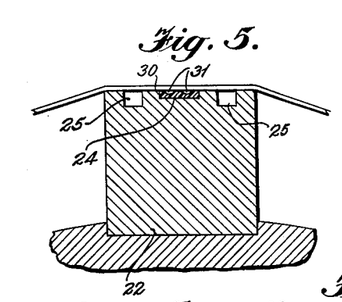
Figure 5 is a sectional view on line 5—5 of Fig. 4 on a still greater scale.
Figure 6:
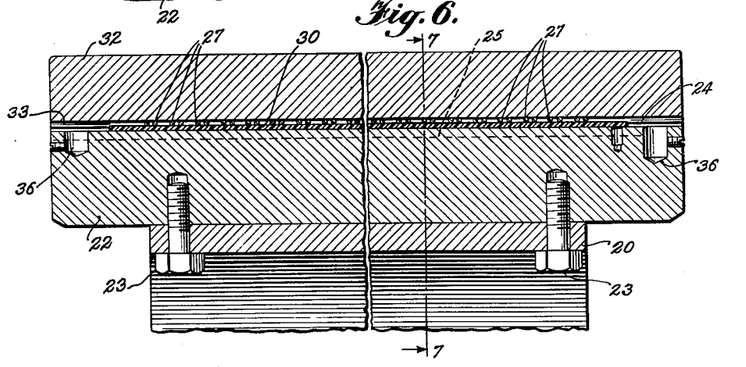
Figure 6 is a sectional view on line 6—6 of Fig. 2.
Figure 7:
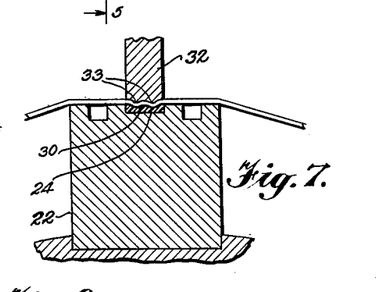
Figure 7 is a sectional view on line 7—7 of Fig. 6 on a greater scale.

Referring first to Figures 1 and 2, the wheel or drum 20 is mounted upon a shaft 21 which is journalled in suitable bearings upon the machine framework, as is set forth in the aforesaid patent. The periphery of the drum in general, defines a cylinder, as appears from Figure 2.

The wheel or drum 20 may be rotated by any suitable means, such as that described in Patent 2,260,558. This means for rotating the drum should successively index it to its different positions at which separate operations will be performed, and it is, therefore, important that this indexing means rotate the drum accurately to each one of its positions. The drum remains in each one of these positions while some operation is being performed at most of the stations presented by the drum.

Mounted upon the periphery of the drum at equally spaced circumferential points are holders 22. These holders 22 are of elongated bar formation and their ends should extend beyond the opposite ends of the drum 20. As here shown, these holders 22 are rectangular in cross section and present an outer generally flat surface. The holders 22 are retained upon the drum 20 by bolts 23 which pass through the drum and into the holders 22. The holders 22 are disposed parallel to each other and to the axis of the shaft 21.

Extending longitudinally of each holder 22 in its outer face is a central channel 24 and side grooves 25 parallel thereto. The channel 24 is wide and relatively shallow and is intended to receive a plastic strip, as will be explained later. The side grooves 25 are narrow and somewhat deeper and are intended to receive a cutting tool for severing the wires, as is set forth in Patent 2,260,558, but only one of these grooves 25 is used at one time.

Transversely of the outermost face of each holder 22 are notches 26 which are each of a width and depth corresponding to the diameter of the wire strand 27 intended to lie in each notch so that the top of the wire 27 will be flush with the outer surface of the holder 22.

The notches 26 extend transversely across the complete width of the outer face of each holder 22 so that a plurality of wires 27 which are laid across this outer face will be accurately positioned transversely of each holder. These wires 27 may be delivered to the holders 22 upon the drum 20 by any suitable means which will locate a wire in each one of the notches and which will continue to supply these wires as the drum 20 is advanced. A suitable wire feeding means is illustrated in Patent 2,260,558.

It has been stated that the drum 20 is advanced at intervals through a definite degree of rotation so as to carry the holders 22 to their respective successive positions. Prior to the position 0, a plastic strip 30 is located in the central channel 24 of holder 22 and this is made possible because the wires 27 have not yet come into contact with the holder 22 and, consequently, free access to the channel 24 is had. When the holder 22 is advanced to position 0, the wires 27 bear downwardly upon the plastic strip 30 and hold it in place in the channel 24.

The plastic strip 30 preferably fits the full width of the channel 24 and it should be only so high as to just bear against the overlying wires 27. The outer face of the strip 30 is formed with two transversely spaced, longitudinally extending parallel grooves 31. These grooves are provided for the purpose of constituting a female die member to be used in making kinks in the wires 27.

When the holder 22 is advanced to position 1, shown in Figure 2, a male die member 32 is positioned above the plastic strip 30 and over the wires 27. This die 32 is preferably of the same width as channel 24 and has formed longitudinally thereof, on the side which is to face toward the plastic strip 30, ribs 33. These ribs 33 are so positioned that they overlie the grooves 31 in the plastic strip 30 and, consequently, constitute a companion die member. In position 1 the die 32 is struck on its outer face with a number of sharp blows to urge the ribs 33 toward the grooves 31 and thereby form two kinks in each one of the wires 27. The die 32 is then removed and the drum 20 is advanced to carry this holder 22 to position 2.

Figure 14:
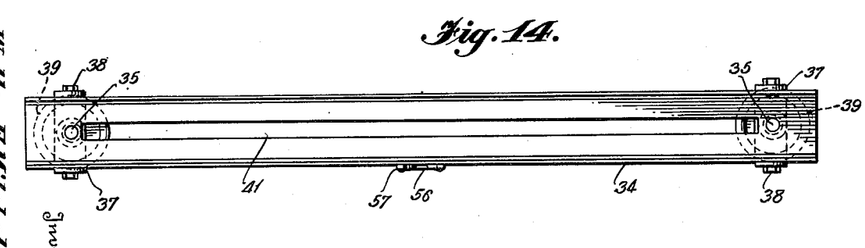
Figure 14 is a plan view of the mold plate used with the heater.

In position 2, a mold plate 34, illustrated in Figure 14, is positioned upon the outer face of the holder 22. This mold plate 34 is accurately positioned upon the holder 22 by providing it at its opposite ends with dowel pins 35 which enter holes 36 in the outer face of each holder 22. It is preferable that one of the pins 35 be longer than the other pin and that the hole 36 which is to receive it be correspondingly deeper so that the mold plate 34 may be positioned upon the holder 22 in only one relationship.

Figure 9:
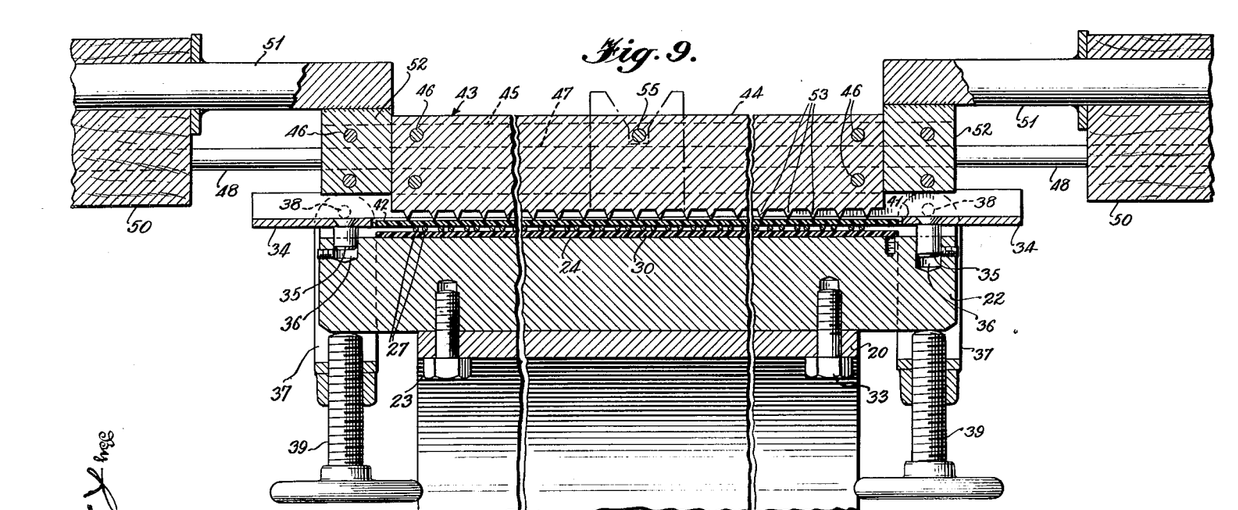
Figure 9 is a sectional view on line 9—9 of Fig. 2 on an enlarged scale.
Figure 10:
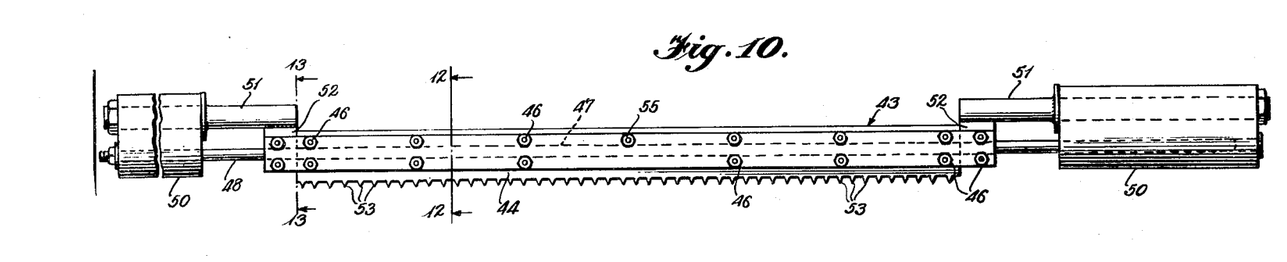
Figure 10 is a side elevational view of the heater to be employed with the invention.
Figure 11:
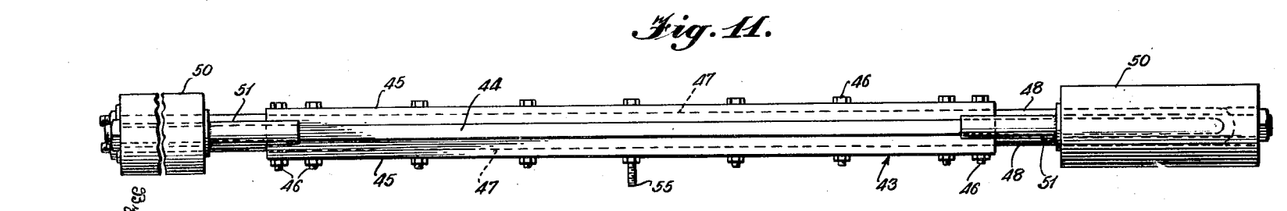
Figure 11 is a plan view of the heater of Fig. 10.
Figure 12:
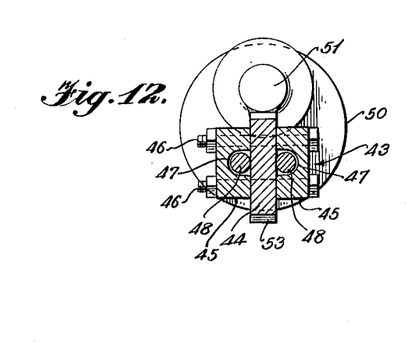
Figure 12 is a sectional view on line 12—12 of Fig. 10 on an enlarged scale.
Figure 13:
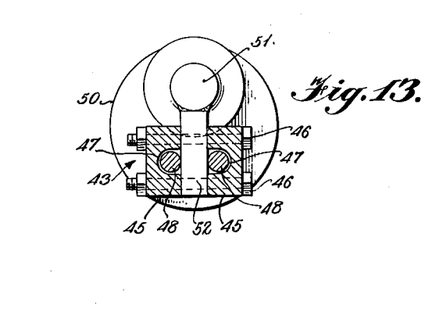
Figure 13 is a sectional view on the line 13—13 of Fig. 10 on an enlarged scale.

It is intended that the mold plate 34 be held firmly onto the holder 22 and to accomplish this, it is provided at its ends with U-clamps 37. The U-clamps 37 are pivoted to the sides of mold plate 34 by the pins 38 so that the U-clamps may be easily swung around the projecting ends of the holder 22 in applying the mold plate 34 to or removing it from the holder 22. The mold plate 34 is held firmly down upon the holder 22 by means of clamping screws 39 which bear against the projecting end portions of holders 22 as appears from Figure 9.

Figure 8:
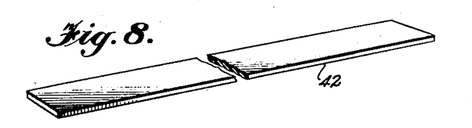
Figure 8 is a perspective view of the upper thermoplastic sealing strip employed with the invention.

Longitudinally of the mold plate 34 is a slot 41. This slot 41 corresponds in width and length to the width and length of the plastic strip 30 which is located in the channel 24 of holder 22 and when the mold plate is properly positioned, slot 41 is in registry with channel 24. Slot 41 is intended to receive a plastic strip 42 which just fits in width, but preferably is of slightly less thickness than the thickness of the mold plate 34. The plastic strip 42 is preferably made of the same material of which plastic strip 30 is formed. It will be noted from Figure 8 that the plastic strip 42 is flat on its sides.

After the mold plate 34 is affixed to holder 22, the plastic strip 42 is positioned over the plastic strip 30 and upon the kinked wires 27. It is intended that heat and pressure be applied to the plastic strip 42 so that it will be molded about the kinked wires 27 and will be fused to the underlying plastic strip 30.

To apply this heat and pressure, the invention contemplates the use of a heater 43 shown in Figures 10–13 inclusive. This heater includes a core bar 44 having substantially the width and length of the slot 41 so that it will enter into this slot. The core bar 44 may be heated in any suitable manner, but in accordance with the invention it is intended that this bar be heated by electric current. On opposite sides of the core bar 44 are clamped heater retainer plates 45, by means of a plurality of bolts 46. The core bar 44 projects downwardly below the retainer plates 45, as appears from Figure 12, so that the retainer plates 45 will not interfere with the entry of the core bar 44 downwardly into the slot 41 of mold plate 34.

On the inner faces of the retainer plates 45 are longitudinally extending grooves 47 in which lie rods 48 having a high electrical resistance. For example, the heaters 48 may be of the type sold under the trade-name "Calrod." These rods 48 are considerably longer than the retainer plates 45 and extend through handles 50 at opposite ends of the heater. The retainer plates 45 are attached to the handles 50 by means of bolts 51 which extend through the handles 50 and have secured thereto depending lugs 52. The retainer plates 45 are longer than the core bar 44 and their extremities are bolted to the lugs 52 and in this manner a rigid assembly is presented.

Electric wires may be attached to the heater rods 48 in any suitable manner so that the passage of current through these rods will heat them and thereby heat the core bar 44. The heater rods 48 on opposite sides of the core bar may be connected to the source of current either in series or in parallel to correctly relate their resistance to the impressed voltage. The handles 50 should be made of some electrical and heat insulating material so that the heat from the heater rods 48 will not injure them and so that the heater may be readily handled by an operator.

The pressure applying side of the core bar 44 is formed with transverse ridges 53. These ridges 53 are uniformly spaced along the entire length of the core bar 44 so that each one of them will form a transverse groove or notch 54 in the plastic material made up of the fused strips 30 and 42, corresponding to each position at which the fused strips are to be severed to form the individual matches. Thus, there will be one of these transverse ridges 53 between every other wire 27 so that each individual match will have therein two kinked wires.

Inasmuch as the transverse ridges 53 must be located accurately for them to form notches 54 in the plastic strips at the desired points relative to the wires 27, positioning means are provided to accurately locate the heater 43 in its longitudinal position. This is accomplished by providing the heater 43 with a laterally projecting pin 55, here shown to be the projecting portion of an elongated one of the bolts 46. This guide pin 55 is intended to enter a notch 56 formed in an upright plate 57 attached to the side of the mold plate 34. The top of the notch 56 is preferably made relatively wide to facilitate the entry of the guide pin 55, but the bottom of this notch 56 should preferably snugly receive the pin 55 so as to thereby accurately position the heater 43 longitudinally with respect to the mold plate 34 and holder 22.

The application of the heater 43 to the plastic strip 42, therefore, serves not only to cause this strip to soften sufficiently for it to be molded about the kinked wires 27, but also for this outer plastic strip 42 to fuse and unite with the inner plastic strip 30. In addition, notches 54 are formed in this composite plastic strip to weaken it along the lines corresponding to the intervals at which this strip is to be broken apart.

Figure 15:
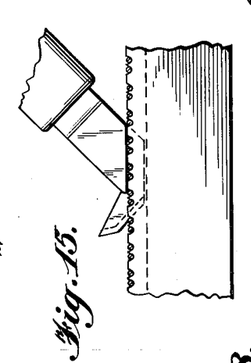
Figure 15 is a fragmentary elevational view showing the cutting of the wires by the severing tool.

After the heater 43 has been applied to the plastic strips for a sufficient period to fuse them, the heater 43 and mold plate 34 are removed and the drum 20 is advanced to carry this holder 22 to position 3. In position 3 a cutter such as the one shown in Fig. 15 is employed to sever the wires 27. This cutting tool is advanced along the proper one of the side grooves 25 in holder 22 to thereby cut the wires in the manner more fully explained in Patent No. 2,260,558. After this groove 25 becomes worn, the holder 22 may be turned around upon drum 20 so that the other side groove 25 will be positioned to receive the cutting tool. In this manner, the useful life of the holder 22 is prolonged. After the wire severing operation, the drum 20 is again advanced to carry the holder 22 to position 4. In this position, the plastic strip is removed and it has the appearance shown in Figs. 16 and 17.

Figure 16:
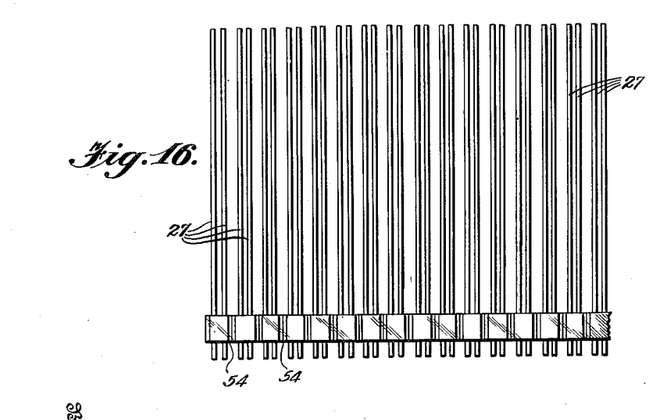
Figure 16 is a plan view of the plastic strip, containing the embedded wires, as it comes from the molding operation.
Figure 17:
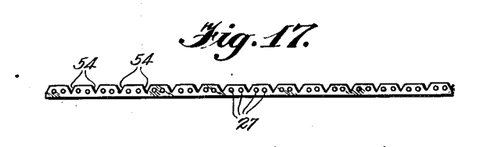
Figure 17 is a front end view of Fig. 16.
Figure 18:
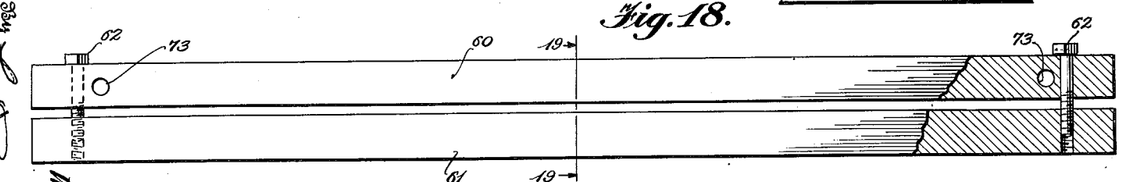
Figure 18 is a front elevational view of a clamp to hold the match strip assembly of Fig. 16.
Figure 19:
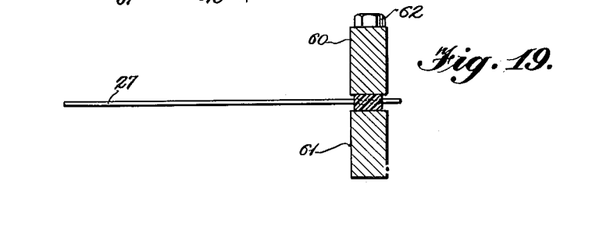
Figure 19 is a sectional view on line 19—19 of Fig. 18 showing a match strip assembly held by the clamp.

Figs. 16 and 17 show the notches 54 which are formed in the plastic strip by the transverse ridges 53 at the points at which the strip is to be broken apart. The plastic strip is now clamped between a holder shown in Figs. 18 and 19 made up of plates 60 and 61 and clamping bolts 62. The continuous strip of matches is held in this holder while it is subjected to the further processing steps which are illustrated and described in connection with Figs. 18 to 45 of Patent No. 2,260,558. This further handling of the matches will be described here briefly as the patent may be referred to for a complete explanation.

Figure 20:
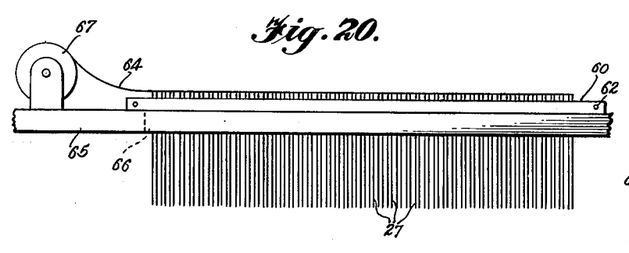
Figure 20 is an elevational view which illustrates the step of soldering a bridge wire or filament to all of the igniter terminals of the group of match heads of the plastic strip of Fig. 16.

To apply a bridge wire 64 across the terminal, or short ends, of the wires 27, the procedure illustrated by Fig. 20, may be followed. The holder plates 60 and 61, with the plastic strip clamped therebetween, is placed upon a table 65. A slot 66 through table 65 permits the long ends of wires 27 to hang downwardly so that the short ends are directed upwardly as shown in Fig. 20.

Figure 21:
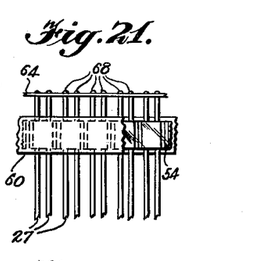
Figure 21 is a fragmentary view, on an enlarged scale, of the group of match heads of Fig. 20 with the single strand of fusible wire soldered to the igniter terminals.

The bridge wire 64 is supplied from a spool 67 supported upon table 65. The wire 64 is laid upon the top ends of the wires 27 and is soldered at the junctions 68 as is shown in Fig. 21. It is important that the bridge wire 64 be of some high electrical resistance material, as Nichrome.

Figure 22:
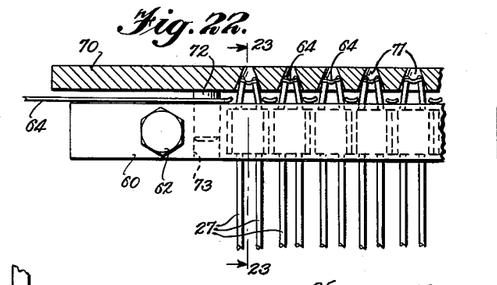
Figure 22 is a fragmentary longitudinal sectional view illustrating the steps of cutting off the bridge wires between the individual matches, and the pinching together of the terminal wires of each match to form a slack in the bridge wires.

The bridge wire 64 should be cut away between the individual match heads so that portions of it remain only as a connection between the terminal, short-ends, of the wires 27 for each match. This cutting operation may be performed simultaneously by means of the cutting plate 70 shown in Figs. 22 and 23. This plate 70 has openings 71 to receive the pair of wires 27 for each match and the lower edge at each opening serves to cut the bridge wire at the outside of the wires 27 for each match.

It is desirable that the short-end terminals of wires be pinched toward each other to form a slack in the connecting bridge wire. This slack permits the terminal ends of wire 27 to move under bending stresses without breaking bridge wires 64. This pinching together of the ends of wires 27 is accomplished by forming the openings 71 in plate 70 of conical shape so that an inward camming effect is had on the upper ends of wires 27, as appears from Fig. 22.

Figure 23:
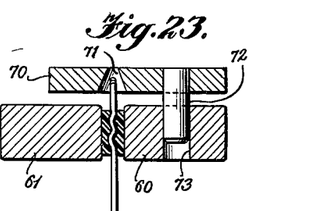
Figure 23 is a transverse vertical sectional view taken on line 23—23 of Fig. 22.

To properly align the plate 70 with respect to the upper ends of wires 27, it is provided with dowel pins 72 near each end. These pins 72 enter holes 73 at each end of holder plate 60, as shown in Fig. 23. The pins 72 enter holes 73 and serve to guide the movement of the cutting and pinching plate 70.

Figures 24, 25:
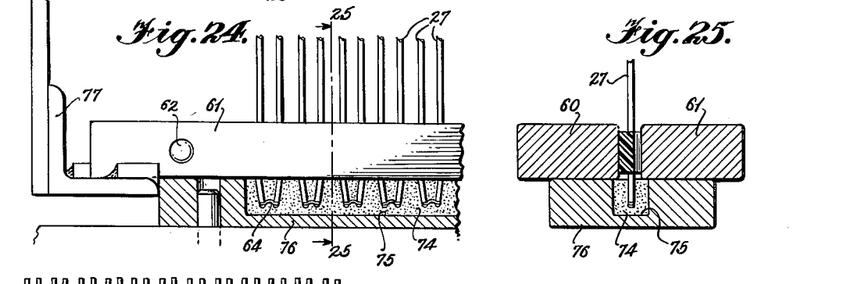
Figure 24 is a detail, fragmentary enlarged view illustrating the step of dipping the terminals and bridge wires of the group of match heads in a coating mixture.
Figure 25 is a transverse vertical sectional view taken on line 25—25 of Fig. 24.

The bridge wires of each match are then to be encased in a body of readily ignitable material, such as the mixture of a low-flash powder mentioned in Patent No. 2,260,558. To apply this coating, the holder made up of plates 60 and 61 is inverted so that the bridge wires 64 are downward as appears from Fig. 24, and may be dipped into a liquid bath 74 containing this material. This liquid bath is contained in a trough 75 in a block 76.

The bridge wires 64 and the adjacent ends of wires 27 are repeatedly dipped into and withdrawn from the liquid bath 74 until a body of the ignitable material has been built up on each match. To facilitate this successive dipping operation, the holder plates 60 and 61 may be supported in brackets 77 which correspond to the brackets 127 of the machine shown in Figs. 36 and 38 of Patent No. 2,260,558.

After a body of powder of sufficient size has been built up for each match head, they should be coated with a moisture proofing material and this may be accomplished by dipping the group of match heads into a bath of this material. This application of the moisture proofing coating may be performed in a manner similar to the dipping operation of Fig. 24. A suitable coating material is that mentioned in Patent No. 2,260,558.

Figures 26, 27:
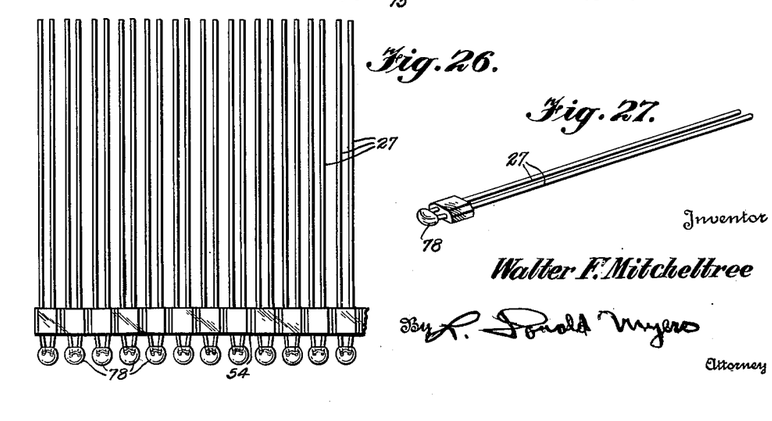
Figure 26 is a plan view of the plastic strip, containing the embedded wires, after the heads have been coated with a powder mixture and a moisture-proof mixture.
Figure 27 is a perspective view of a finished and separated match.

After the group of bridge wires for the matches have been encased in the powder material and water proofing material, each match head 78 has the appearance shown in Fig. 26. When the plastic strip is then removed from between holder plates 60 and 61, it has the appearance shown in Fig. 26, and the matches may be supplied to the user in this combined form if desired. By breaking the plastic strip at the notches 54, the separate matches shown in Fig. 27 are obtained, and they may be supplied to the user in this form.

It may be mentioned that the long ends of the wires 27 may be cleaned and tinned as a group, in the manner explained in Patent No. 2,260,558.

Any thermoplastic material may be used in making the strips 30 and 42, which will mold about the kinked wires 27 and fuse together under the heat and pressure applied by heater 43, and which will afford the desired strength to rigidly and strongly retain the two wires of each match in assembled relation. One suitable thermoplastic material is Tenite II No. 201 S2 Gray, sold by the Tennessee Eastman Company. With this material a heater temperature of 800° F. is appropriate. It is to be understood, however, that the strips 30 and 42 may be made of some thermoplastic material other than cellulose acetate or cellulose acetate butyrate.

It will be appreciated that the use of these plastic strips 30 and 42 to form the plug for each match, affords an appreciable advantage over the use of the sulfur composition referred to in Patent No. 2,260,558. It is not necessary to pour the individual match plugs and a considerable saving in time is therefore effected. Also there is no waste of material such as occurs with the use of the sulfur composition due to spillage and handling losses.

Having thus described the invention, I claim:

1. In the method of making electrically ignited match heads, the steps comprising assembling in web form a plurality of wires, locating a strip of thermoplastic material transversely of the full width of said web, locating a second strip of thermoplastic material on the opposite side of said web and in opposing relation to said first strip, applying heat and pressure to said strips to fuse them together and thereby bind the wires, forming transverse indentations at spaced locations along the length of the fused strips while in a plastic state from said heat to form fracture points between each pair of wires, and after applying a bridge wire and ignitable material at the ends of each pair of wires, fracturing the fused strips at said indentations to thereby form individual matches.

2. In the method of making electrically ignited match heads, the steps comprising assembling in web form a plurality of wires, locating a strip of thermoplastic material transversely of the full width of said web, forming kinks in said wires at said strip by deforming the wires into depressions in said strip, applying a second strip of thermoplastic material to the first strip or the opposite side of said wires, simultaneously applying heat and pressure to said strips to fuse them together about the kinked portions of the wires, forming transverse indentations at spaced locations along the length of the strips while in a heated, plastic state to form fracture points between each pair of wires, and after applying a bridge wire and ignitable material at the ends of each pair of wires, fracturing the fused strips at said indentations to thereby form individual matches.

3. In the method of making electrically ignited match heads, the steps comprising assembling in web form a plurality of wires, locating a strip of thermoplastic material transversely of the full width of said web, kinking said wires where they overlie said strip, applying a second strip of thermoplastic material to the first strip on the opposite side of said wires, applying heat and pressure to said strips to fuse them together about the kinked portions of said wires, forming spaced indentations along the length of the strips while in a heated, plastic state to form fracture points between each pair of wires, and after applying a bridge wire and ignitable material at the ends of each pair of wires, fracturing the fused strips at said indentations to thereby form individual matches.

4. In the method of making electrically ignited match heads, the steps comprising assembling in web form a plurality of wires, locating a strip of thermoplastic material transversely of the full width of said web, kinking said wires where they overlie said strip, applying a second strip of thermoplastic material to the first strip on the opposite side of said wires, applying heat and pressure to said strips while retaining the strips against lateral deformation, to fuse them together about the kinked portions of said wires, forming spaced indentations along the length of the strips while in a heated, plastic state to form fracture points between each pair of wires, and after applying a bridge wire and ignitable material at the ends of each pair of wires, fracturing the fused strips at said indentations to thereby form individual matches.

5. In the method of making electrically ignited match heads, the steps comprising assembling a plurality of wires in a common plane, positioning a strip of thermoplastic so as to engage all of said wires on one side of said plane, positioning a second strip of thermoplastic material to overlie the first strip and engage the opposite sides of said wires, applying heat to said strips to fuse the strips together about said wires and to simultaneously form indentations spaced along the length of the fused strips to constitute fracture points between each pair of wires, and applying a bridge wire and ignitable material at the ends of each pair of wires.

6. In the method of making electrically ignited match heads, the steps comprising assembling a plurality of wires in spaced parallelism, positioning a strip of thermoplastic material so as to engage and underlie all of said wires, forming kinks in said wires at said strip by deforming the wires into depressions in said strip, positioning a second strip of thermoplastic material to overlie the first strip on the opposite sides of and engaging said wires, applying heat to fuse the strips together about said wires and simultaneously form indentations spaced along the length of the fused strips to constitute fracture points between each pair of wires, and applying a bridge wire and ignitable material at the ends of each pair of wires.

7. In the method of making electrically ignited match heads, the steps comprising positioning strips of thermoplastic material transversely of and on opposite sides of a pair of parallel wires, fusing said strips together by the application of heat and pressure to thereby imbed the wires, and applying a bridge wire and ignitable material to the pair of wires on one side of the fused plastic strips.

8. In the method of making electrically ignited match heads, the steps comprising positioning strips of thermoplastic material transversely of and on opposite sides of a pair of parallel wires, fusing said strips together by the application of heat and pressure while maintaining the strips against lateral deformation to thereby imbed the wires, and applying a bridge wire and ignitable material to the pair of the wires on one side of the fused plastic strips.

9. In the method of making electrically ignited match heads, the steps comprising positioning strips of thermoplastic material transversely of and on opposite sides of kinked portions of a plurality of parallel wires assembled in web form, fusing said strips together by the application of heat and pressure while maintaining the strips against lateral deformation to thereby imbed the wires, and after applying a bridge wire and ignitable material to successive pairs of the wires on one side of the plastic strips, severing the strips between said pairs of wires to thereby form individual matches.

10. In the method of making electrically ignited match heads, the steps comprising positioning strips of thermoplastic material transversely of and on opposite sides of a plurality of parallel wires assembled in web form, fusing said strips together by the application of heat and pressure to thereby imbed the wires, notching said strips between successive pairs of the wires to form fracture points, and supporting the fused strips to afford strength to enable subsequent handling of the wires and thermoplastic material as a unit.

WALTER F. MITCHELTREE.

REFERENCES CITED

The following references are of record in the file of this patent:

UNITED STATES PATENTS

| Number | Name | Date |
| --- | --- | --- |
| 512,464 | Carey | Jan. 9, 1894 |
| 665,989 | Bechtold | Jan. 15, 1901 |
| 2,204,994 | Johnson | June 18, 1940 |
| 2,212,118 | Handforth et al. | Aug. 20, 1940 |
| 2,212,474 | Johnson et al. | Aug. 20, 1940 |
| 2,260,558 | Caughey et al. | Oct. 28, 1941 |
| 2,429,490 | Scherrer | Oct. 21, 1947 |
| 2,431,871 | Huyett | Dec. 2, 1947 |

FOREIGN PATENTS

| Number | Country | Date |
| --- | --- | --- |
| 568,831 | Germany | Jan. 24, 1933 |
| 523,217 | Great Britain | July 9, 1940 |